US012664666B2

(12) United States Patent
Bolouki et al.

(10) Patent No.: US 12,664,666 B2
(45) Date of Patent: Jun. 23, 2026

(54) ACTIVITY ZONE FOR CAMERA VIDEO

(71) Applicant: APPLE INC., Cupertino, CA (US)

(72) Inventors: Sara Bolouki, Mountain View, CA (US); Yah Yah Cason, Las Vegas, NV (US); Jonghoon Jin, Cupertino, CA (US); Nils Ängquist, Los Altos, CA (US); Hendrik Dahlkamp, Redwood City, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/421,795

(22) Filed: Jan. 24, 2024

(65) Prior Publication Data

US 2024/0161308 A1      May 16, 2024

Related U.S. Application Data

(63) Continuation of application No. 17/199,166, filed on Mar. 11, 2021, now Pat. No. 11,908,143.

(Continued)

(51) Int. Cl.
*G06T 7/20* (2017.01)
*G06N 3/08* (2023.01)

(52) U.S. Cl.
CPC .................. *G06T 7/20* (2013.01); *G06N 3/08* (2013.01); *G06T 2207/10016* (2013.01); *G06T 2207/20081* (2013.01); *G06T 2207/20084* (2013.01)

(58) Field of Classification Search
CPC ............. G06T 7/20; G06T 2207/10016; G06T 2207/20081; G06T 2207/20084;

(Continued)

(56) References Cited

U.S. PATENT DOCUMENTS 8,063,929 B2 * 11/2011 Kurtz ..................... H04N 7/147
348/14.09
8,154,578 B2 * 4/2012 Kurtz ..................... G06V 40/20
348/14.08
(Continued)

FOREIGN PATENT DOCUMENTS

CN          109788188 B  * 12/2020  ............. H04N 23/66
WO  WO-2008153822 A2 * 12/2008  ............. H04N 7/142
(Continued)

OTHER PUBLICATIONS

US 11,670,113 B2, 06/2023, Dahlkamp et al. (withdrawn)
(Continued)

*Primary Examiner* — Stephen R Koziol
*Assistant Examiner* — Benedict E Lee
(74) *Attorney, Agent, or Firm* — BAKERHOSTETLER; Kyle B. Morse

(57) ABSTRACT

Methods and systems are provided for establishing an activity zone within video captured by a camera. A user device may establish an activity zone or an exclusion zone within video representing a physical view captured by the camera. An automatic monitoring system may analyze the video of the camera with respect to the activity zone or exclusion zone and trigger notifications that are associated with a zone so as to limit notifications transmitted to the user device to those notifications that are relevant to the user. With activity or exclusion zones video from a camera may be automatically monitored to reduce a volume of notifications transmitted to the user device.

21 Claims, 6 Drawing Sheets

Related U.S. Application Data

(60) Provisional application No. 63/034,262, filed on Jun. 3, 2020.

(58) Field of Classification Search
CPC ............ G06T 2207/30232; G06N 3/08; G06N 3/045; H04N 19/43; H04N 19/51; H04N 7/18; H04N 7/186; H04N 7/183; G08B 13/196; G08B 13/19602; G08B 13/19606; G08B 13/19671; G08B 13/19673
See application file for complete search history.

(56) References Cited

U.S. PATENT DOCUMENTS

| | | | |
|---|---|---|---|
| 8,189,577 B2 | 5/2012 | Vaswani et al. | |
| 8,253,770 B2 * | 8/2012 | Kurtz ..................... | H04N 7/142 |
| | | | 348/14.08 |
| 8,325,033 B2 * | 12/2012 | Feldstein ............ | H04L 12/2825 |
| | | | 340/539.18 |
| 8,365,010 B2 | 1/2013 | Olson et al. | |
| 8,711,217 B2 | 4/2014 | Venetianer et al. | |
| 8,804,997 B2 | 8/2014 | Gagvani et al. | |
| 9,197,861 B2 | 11/2015 | Saptharishi et al. | |
| 9,392,248 B2 * | 7/2016 | Wheeler .............. | H04N 21/816 |
| 9,779,307 B2 | 10/2017 | Laska et al. | |
| 9,830,503 B1 | 11/2017 | Martin et al. | |
| 9,883,027 B2 | 1/2018 | Dave et al. | |
| 10,013,153 B1 | 7/2018 | Freeman et al. | |
| 10,049,281 B2 | 8/2018 | Verano et al. | |
| 10,217,068 B1 | 2/2019 | Davis et al. | |
| 10,242,266 B2 * | 3/2019 | Jones ........................ | G06N 3/08 |
| 10,255,683 B1 * | 4/2019 | Gopal .................... | G06V 20/52 |
| 10,425,475 B2 | 9/2019 | Cahana et al. | |
| 10,586,433 B2 * | 3/2020 | Stewart ............ | G08B 13/19606 |
| 10,594,987 B1 * | 3/2020 | Nixon ........................ | H04N 7/18 |
| 10,762,646 B2 * | 9/2020 | Modestine ............. | G06V 20/52 |
| 10,861,168 B2 * | 12/2020 | Yu ........................ | G06N 3/0495 |
| 10,929,798 B1 | 2/2021 | Kinney et al. | |
| 10,992,492 B2 * | 4/2021 | Beach ..................... | G06N 5/022 |
| 11,184,589 B2 * | 11/2021 | Scalisi ............. | G08B 13/19684 |
| 11,232,688 B1 * | 1/2022 | Lemberger ............... | H04N 7/18 |
| 11,259,076 B2 * | 2/2022 | Matsuoka .............. | H04N 21/44 |
| 11,295,140 B2 * | 4/2022 | Wang ..................... | G06V 10/26 |
| 11,328,153 B1 | 5/2022 | Mumm et al. | |
| 11,356,352 B2 | 6/2022 | Rauenbuehler et al. | |
| 11,514,717 B2 | 11/2022 | Dahlkamp et al. | |
| 11,710,348 B2 | 7/2023 | Dahlkamp et al. | |
| 11,908,143 B2 | 2/2024 | Bolouki et al. | |
| 11,921,831 B2 | 3/2024 | Khadloya et al. | |
| 12,014,611 B1 * | 6/2024 | Zareba ............. | G08B 13/19602 |
| 12,021,724 B2 | 6/2024 | Rauenbuehler et al. | |
| 12,131,583 B2 | 10/2024 | Dahlkamp et al. | |
| 2003/0023690 A1 | 1/2003 | Lohtia | |
| 2004/0136574 A1 | 7/2004 | Kozakaya et al. | |
| 2006/0204058 A1 | 9/2006 | Kim et al. | |
| 2007/0014244 A1 | 1/2007 | Srinivasan et al. | |
| 2013/0086607 A1 | 4/2013 | Tom et al. | |
| 2013/0182918 A1 | 7/2013 | Kovtun et al. | |
| 2014/0050372 A1 | 2/2014 | Qi et al. | |
| 2015/0074259 A1 | 3/2015 | Ansari et al. | |
| 2015/0131648 A1 | 5/2015 | Shuman et al. | |
| 2016/0005280 A1 | 1/2016 | Laska et al. | |
| 2016/0043827 A1 | 2/2016 | Filson et al. | |
| 2016/0092724 A1 | 3/2016 | Jeong | |
| 2017/0257226 A1 | 9/2017 | Bi | |
| 2017/0262472 A1 | 9/2017 | Goldenberg | |
| 2017/0344703 A1 | 11/2017 | Ansari et al. | |
| 2018/0151039 A1 * | 5/2018 | Lemberger .......... | H04L 12/4625 |
| 2018/0232592 A1 | 8/2018 | Stewart et al. | |
| 2018/0268202 A1 | 9/2018 | Yu et al. | |
| 2018/0276465 A1 | 9/2018 | Lee et al. | |
| 2018/0285628 A1 | 10/2018 | Son et al. | |
| 2018/0338120 A1 * | 11/2018 | Lemberger ............. | G06V 20/41 |
| 2018/0350213 A1 | 12/2018 | Bart et al. | |
| 2018/0373924 A1 | 12/2018 | Yoo et al. | |

| | | | |
|---|---|---|---|
| 2019/0063140 A1 | 2/2019 | Trundle et al. | |
| 2019/0087647 A1 | 3/2019 | Du | |
| 2019/0139381 A1 | 5/2019 | Harpole | |
| 2019/0155659 A1 | 5/2019 | Rodriguez Bravo et al. | |
| 2019/0205620 A1 | 7/2019 | Yi et al. | |
| 2019/0236342 A1 | 8/2019 | Madden et al. | |
| 2020/0082157 A1 | 3/2020 | Susskind et al. | |
| 2020/0388139 A1 | 12/2020 | Saha et al. | |
| 2021/0006835 A1 | 1/2021 | Slattery et al. | |
| 2021/0134100 A1 | 5/2021 | Larovere et al. | |
| 2021/0383100 A1 | 12/2021 | Dahlkamp et al. | |
| 2021/0383554 A1 | 12/2021 | Bolouki et al. | |

FOREIGN PATENT DOCUMENTS

| | | | | |
|---|---|---|---|---|
| WO | WO-2018175328 A1 * | 9/2018 | ............. | H04N 7/186 |
| WO | 2019222725 A1 | 11/2019 | | |

OTHER PUBLICATIONS

Office Action issued in European Application No. EP21734694.9, dated Nov. 4, 2024 in 10 pages.

Sasidharan, et al., entitled IoT Based Cryptolock With Face Recognition Using AES-256 Bit Algorithm; Studies in Indian Place Names(UGC Care Journal), vol. 40, dated Nov. 4, 2024, pp. 1361-1366.

Non-Final Office Action issued in U.S. Appl. No. 17/469,630, dated Jan. 29, 2025 in 26 pages.

Non-Final Office Action issued in U.S. Appl. No. 17/469,630, dated Jul. 30, 2024 in 26 pages.

Supplemental Notice of Allowability in U.S. Appl. No. 17/949,880, dated Aug. 23, 2024 in 2 pages.

Notice of Allowance issued in U.S. Appl. No. 17/716,332, dated Feb. 22, 2024 in 8 pages.

Non-Final Office Action issued in U.S. Appl. No. 17/949,880, dated Feb. 5, 2024 in 41 pages.

Wang, et al., "Masked Face Recognition Dataset and Application," Available online At: https://arxiv.org/pdf/2003.09093.pdf, Cornell University Library; dated Mar. 23, 2020 in 3 pages.

Ejaz, et al., "Masked Face Recognition Using Convolutional Neural Network," 2019 International Conference on Sustainable Technologies for Industry 4.0 (STI), 978-1-7281-6099-3/19/$31.00 © 2019 IEEE, dated Dec. 25, 2019 in 6 pages.

Extended European Search Report issued in European Application No. EP21196868.0, dated Feb. 3, 2022 in 7 pages.

Office Action issued in European Application No. EP21196868.0, dated Dec. 6, 2023 in 5 pages.

First Examination Report issued in India Application No. IN2021140414, dated May 24, 2022 in 7 pages.

Non-Final Office Action issued in U.S. Appl. No. 17/469,630, dated Jan. 2, 2024 in 24 pages.

Final Office Action issued in U.S. Appl. No. 17/469,630, dated Apr. 11, 2024 in 27 pages.

Ejaz et al., "Masked Face Recognition Using Convolutional Neural Network", 2019 International Conference on Sustainable Technologies for Industry 4.0 (STI), Dec. 25, 2019 in 6 pages.

First Examination Report issued in India Application No. IN202114041420, dated May 24, 2022 in 7 pages.

Wang et al., "Masked Face Recognition Dataset and Application", Available online At: https://arxiv.org/pdf/2003.09093.pdf, Cornell University Library, Mar. 23, 2020, pp. 1-3.

Notice of Allowance issued in U.S. Appl. No. 17/949,880, dated Jun. 27, 2024 in 7 pages.

Article entitled, "Using Your Video Services", Telus, Available Online at: https://www.telus.com/en/bc/support/article/using-your-video-services, dated Mar. 27, 2020, pp. 1-13 (as-of record in parent application).

Notice of Allowance issued in U.S. Appl. No. 17/032,619, dated Dec. 21, 2021 in 9 pages (as-of record in parent application).

Notice of Allowance issued in U.S. Appl. No. 17/032,619, dated Feb. 9, 2022 in 9 pages (as-of record in parent application).

Non-Final Office Action issued in U.S. Appl. No. 17/033,423, dated Mar. 22, 2022 in 62 pages (as-of record in parent application).

(56)  References Cited

OTHER PUBLICATIONS

Notice of Allowance issued in U.S. Appl. No. 17/033,423, dated Aug. 24, 2022 in 7 pages (as-of record in parent application).
Final Office Action issued in U.S. Appl. No. 17/199,166, dated Jun. 20, 2023 in 18 pages (as-of record in parent application).
Non-Final Office Action issued in U.S. Appl. No. 17/199,166, dated Jan. 27, 2023 in 24 pages (as-of record in parent application).
Notice of Allowance issued in U.S. Appl. No. 17/199,166, dated Oct. 10, 2023 in 8 pages (as-of record in parent application).
Final Office Action issued in U.S. Appl. No. 17/716,332, dated Nov. 13, 2023 in 10 pages (as-of record in parent application).
Non-Final Office Action issued in U.S. Appl. No. 17/716,332, dated May 10, 2023 in 14 pages (as-of record in parent application).
Corrected Notice of Allowability issued in U.S. Appl. No. 17/949,876, dated Apr. 24, 2023 in 2 pages (as-of record in parent application).
Corrected Notice of Allowability issued in U.S. Appl. No. 17/949,876, dated Jun. 12, 2023 in 2 pages (as-of record in parent application).
Non-Final Office Action issued in U.S. Appl. No. 17/949,876, dated Jan. 5, 2023 in 23 pages (as-of record in parent application).
Notice of Allowance issued in U.S. Appl. No. 17/949,876, dated Jan. 25, 2023 in 7 pages (as-of record in parent application).
Final Office Action issued in U.S. Appl. No. 17/949,880, dated Jul. 24, 2023 in 50 pages (as-of record in parent application).
Non-Final Office Action issued in U.S. Appl. No. 17/949,880, dated Jan. 5, 2023 in 45 pages (as-of record in parent application).
Pandit et al., "Intelligent Security Lock", International Conference on Trends in Electronics and Informatics ICEI 2017, IEEE, dated May 11-12, 2017, pp. 713-716 (as-of record in parent application).
Pawar et al., "Smart Home Security using IoT and Face Recognition", 2018 Fourth International Conference on Computing Communication Control and Automation (ICCUBEA), dated Aug. 16-18, 2018, pp. 1-6 (as-of record in parent application).
International Preliminary Report on Patentability issued in PCT Application No. PCT/US2021/034748, dated Dec. 15, 2022 in 7 pages (as-of record in parent application).
International Search Report and Written Opinion issued in PCT Application No. PCT/US2021/034748, dated Sep. 8, 2021 in 10 pages (as-of record in parent application).
International Preliminary Report on Patentability issued in PCT Application No. PCT/US2021/035005, dated Dec. 15, 2022 in 8 pages (as-of record in parent application).
International Search Report and Written Opinion issued in PCT Application No. PCT/US2021/035005, dated Sep. 21, 2021 in 11 pages (as-of record in parent application).

* cited by examiner

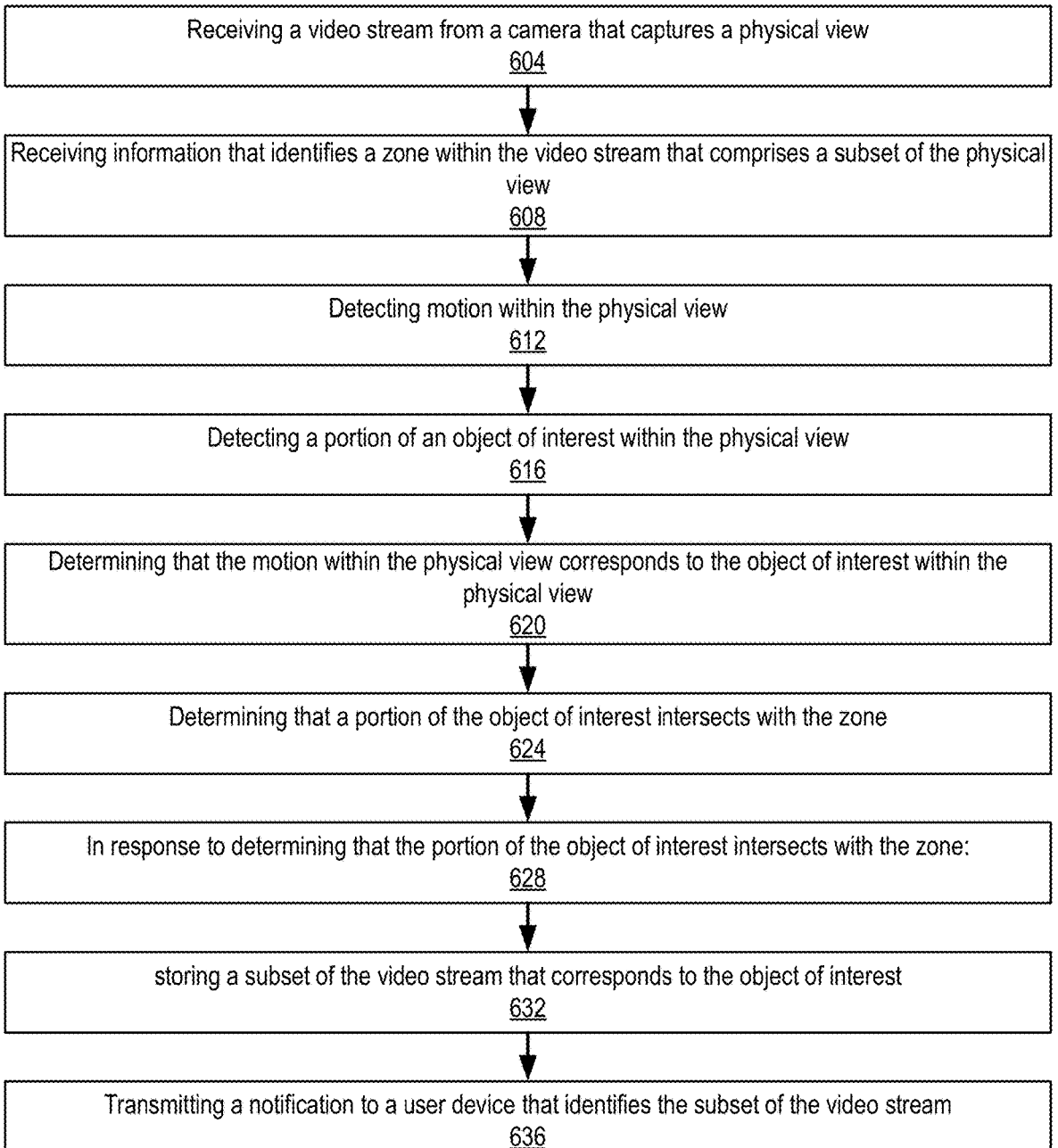

Receiving a video stream from a camera that captures a physical view
604

Receiving information that identifies a zone within the video stream that comprises a subset of the physical view
608

Detecting motion within the physical view
612

Detecting a portion of an object of interest within the physical view
616

Determining that the motion within the physical view corresponds to the object of interest within the physical view
620

Determining that a portion of the object of interest intersects with the zone
624

In response to determining that the portion of the object of interest intersects with the zone:
628 storing a subset of the video stream that corresponds to the object of interest
632

Transmitting a notification to a user device that identifies the subset of the video stream
636

*FIG. 6*

ACTIVITY ZONE FOR CAMERA VIDEO

CROSS-REFERENCES TO RELATED APPLICATIONS

The present application is a continuation of U.S. application Ser. No. 17/199,166, filed Mar. 11, 2021, entitled "ACTIVITY ZONES FOR CAMERA VIDEO," which claims the benefit of and priority to U.S. Provisional Application No. 63/034,262, filed Jun. 3, 2020, entitled "ACTIVITY ZONES FOR CAMERA VIDEO." The entire contents of which are incorporated herein by reference for all purposes.

BACKGROUND

Electronic devices are becoming increasingly popular in a range of applications. Mobile phones, tablet computers, home entertainment systems, and the like are just some of the electronic devices users interact with regularly.

Another category of electronic devices that are becoming more popular includes various electronically controllable devices, such as thermostats, lighting devices, household appliances, security cameras, etc. Users want to control these devices easily and conveniently using mobile devices and the like and to automate their operation.

SUMMARY

At present, cameras can be utilized to monitor aspects of buildings. In some instances, the cameras may be embedded in a smart appliance. For instance, cameras may be included in an electronically controllable doorbell to provide video associated with an entity that activated the doorbell. When the camera detects motion, it may transmit a notification to a user indicating that motion was detected. When cameras are positioned in view of public spaces (e.g., sidewalks, public streets, etc.) or neighboring buildings (e.g., shared walkways, shared driveways, windows of the adjacent buildings, etc.), users may be inundated with notifications associated with motion in the public places or neighboring buildings that are not relevant to the user.

A user device may establish an activity zone or an exclusion zone within video representing a physical view captured by the camera. An automatic monitoring system may analyze the video of the camera with respect to the activity zone or exclusion zone and only trigger notifications that are associated with a zone so as to limit notifications transmitted to the user device to those notifications that are relevant to the user. With activity or exclusion zones, video from a camera may be automatically monitored to reduce the volume of notifications transmitted to the user device.

The following detailed description, together with the accompanying drawings, will provide a better understanding of the nature and advantages of the present disclosure.

BRIEF DESCRIPTION OF THE DRAWINGS

FIG. 6 shows a flow diagram of a process for detecting objects of interest within activity zones of a physical view captured by a camera according to an embodiment of the present disclosure.

DETAILED DESCRIPTION

The present disclosure involves selection of activity zones within a physical view captured by a camera for object detection. Object detection can be improved using activity zones to prevent spurious and superfluous object detections resulting from the physical view, including areas not of interest. A user may identify a portion of a physical view captured by a camera to be an activity zone. The camera may monitor for motion occurring in video of the physical view and, in response, transmit a notification to a resident device. The resident device may then request a subset of the video that corresponds to the motion. The resident device uses an object detection process to determine if the motion corresponds to an object of interest and whether the object of interest intersects with the activity zone. In response to determining that the object of interest corresponds to the motion and intersects with the activity zone, the resident device may send at least a portion of the subset of the video to a user device. Video can be transmitted to a resident device, which executes an object detection process to identify objects of interest within the video. If an object of interest is detected, then a notification can be sent to a user for further processing or action. Activity zones can prevent spurious and/or superfluous notifications of detected objects resulting from objects detected within a portion of the physical view that is not of interest. The techniques described herein can also enable the detection of objects of interest within an activity zone, even when the recognizable portion of the object of interest is outside the activity zone.

Example Environment

Figure 1:
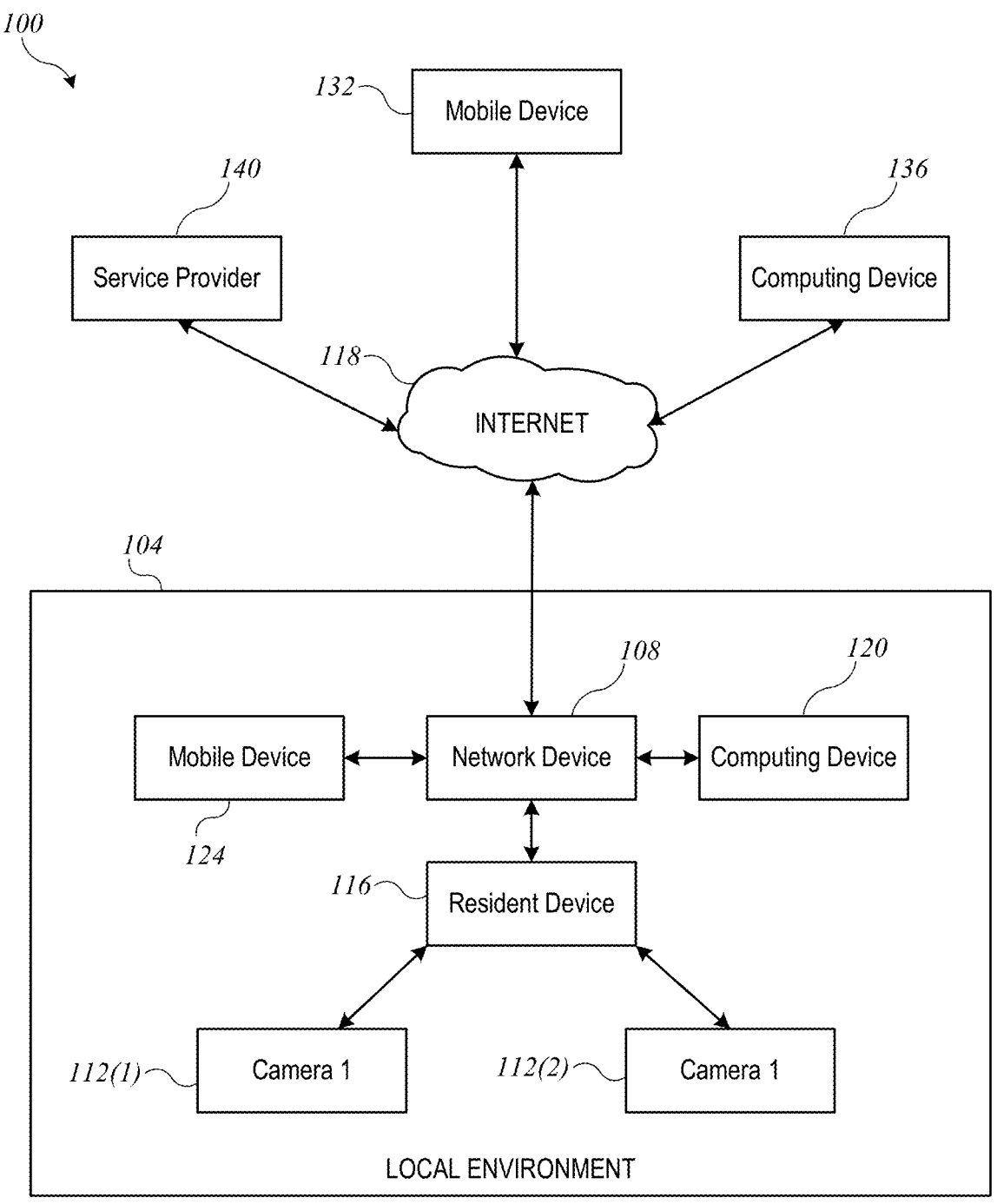
FIG. 1 illustrates a network environment for object detection using activity zones according to an embodiment of the present disclosure.

FIG. 1 illustrates a network environment for object detection using activity zones according to an embodiment of the present disclosure. Network environment 100 can include local environment 104, which includes electronic devices within the same geographical area (such as a building) and operated by the same entity. Local environment 104 includes network device 108 that facilitates communications between the various devices of the local environment 104 and external devices and/or networks. Network device 108 may include any device configured to route communications between two or more devices, such as, but not limited to, a router, a switch, a proxy device, a server, or the like.

Electronic devices of local environment 104 may include both automation devices configured to automate processes of local environment 104, and user-operated devices. Examples of user-operated automation devices include devices that automate security operations (e.g., such as monitoring security cameras, smoke/gas detectors, intrusion detection, and the like) and devices that automate environmental operations (e.g., such operation of a thermostat, power, lights, and the like). Automation devices may be self-automating (e.g., the automation devices include hardware and/or software that automates the operations of the automation device) or automated by an external device.

For instance, local environment 104 can include one or more cameras, such as camera 112(1) and camera 112(2). In some instances, camera 112(1) and camera 112(2) may be operated by resident device 116. Resident device 116 may execute operations that automate the operations of camera 112(1) and camera 112(2). In some instances, resident device 116 may be a device that provides services within a local network, such as, but not limited to, a smart speaker, a set-top box, a tablet, a mobile device, or the like. In other instances, resident device 116 may be a control device that includes processing resources that can execute operations (as shown in FIG. 1). In still yet other instances, resident device 116 may include software processes that are executed by another device of local environment 104 or a device associated with local environment 104 resident device. Alternatively, the resident device may execute on mobile device 124, which can be, for example, a smartphone, a laptop, a personal digital assistant, a tablet, a wearable device, or any processing device configured to move in and out of local environment 104. For example, mobile device 124 may operate inside local environment 104 over a first time interval and outside local environment 104 over a second time interval.

Network device 108 may route communications received from external devices and/or networks to devices within local environment 104. For instance, when mobile device 124 operates externally from local environment 104, mobile device 124 may transmit communications through an external network such as Internet 118 addressed to local environment 104 (network device 108 or a specific device of local environment 104). Network device 108 may receive external communications and route them to appropriate devices within local environment 104.

In some instances, other external devices may access the operations of automation devices of local environment 104. For instance, mobile device 132 or computing device 136 may access video streams from camera 112(1) and/or camera 112(2). In some instances, mobile device 132 or computing device 136 may execute a resident device that performs object detection in addition to or in place of resident device 116.

Service provider 140 may be a server configured to maintain automation devices or provide access to automation devices. For instance, service provider 140 may be associated with a manufacturer or user of automation devices in use in local environment 104 and/or other local environments. Service provider 140 may provide automatic software updates, diagnostics, or the like to maintain the operability of automation devices. Service providers may also provide interfaces for interacting with automation devices. For instance, service providers may provide application programming interfaces (APIs) that command line control of operations of automation devices. The APIs may also enable command-and-control messaging in which communications, including communications to execute operations of the automation device, may be transmitted to and received from the automation device. Service provider 140 may provide graphical user interfaces (GUIs) to a device of service provider 140 or a device connected to service provider 140 (such as computing device 120, mobile device 124, computing device 136, and/or mobile device 132). The GUIs may enable graphical control of operations of automation devices, settings of automation devices, and/or visual inspection of data received from automation devices (e.g., video, sensors, or the like).

Figure 2:
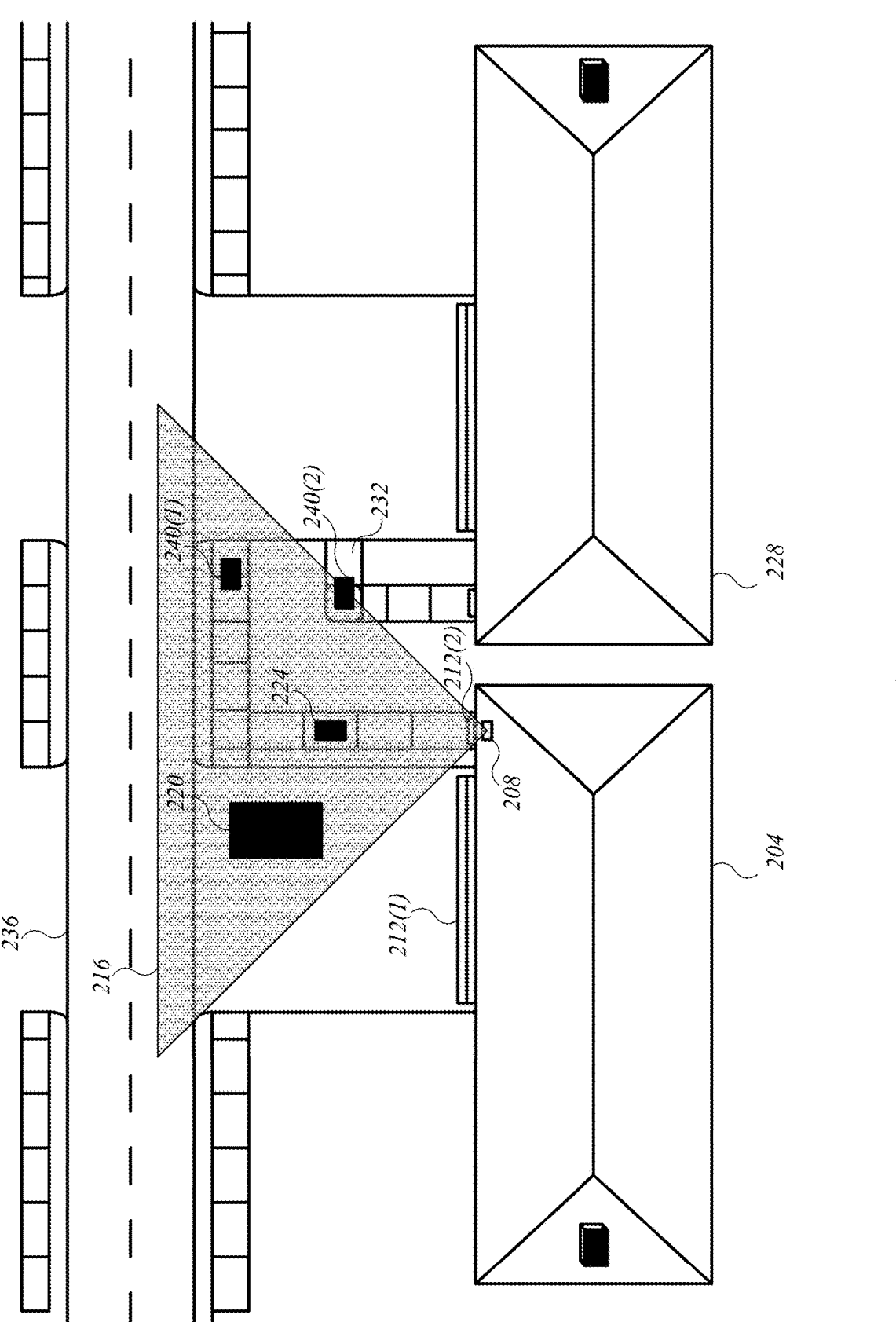
FIG. 2 illustrates an example operation of a fixed-position camera according to an embodiment of the present disclosure.

FIG. 2 illustrates an example operation of a fixed-position camera according to an embodiment of the present disclosure. Modern buildings can include a number of automation devices, such as environmental devices (e.g., thermostats, power controllers, light controllers, smart bulbs, and the like) and security devices, such as cameras. Cameras may be indirectly automated by automating monitoring of the video captured by the camera. Automated monitoring may be performed by the camera itself or by another device (e.g., such as a resident device operating on another device). For example, building 204, in this example, a house, operates fixed-position camera 208 to monitor access point 212(1) and access point 212(2) to building 204. Camera 208 captures a video of a physical view of 216 of an area outside of building 204. The camera may be oriented such that physical view 216 includes coverage of a driveway of building 204 so as to monitor at least a portion of a vehicular access point (e.g., access point 212(1)) and coverage of a walkway to a door of building 204 so as to monitor a pedestrian access point (e.g., access point 212(2)).

Camera 208 may detect motion within physical view 216, such as from object 220 approaching (or departing) access point 212(1) or object 224 approaching (or departing) access point 212(2). The camera may detect motion through embedded sensors (e.g., infrared, radar, thermal, or the like) or through automated analysis of video captured by camera 208. For instance, camera 208 may generate a pixel map when no motion is detected. The pixel map may include a color value for each pixel captured by the camera over a time interval. The time interval may be an instant such that a single color value is captured for each pixel, or the time interval may be of any predetermined length such that the color value of each pixel is equal to an average of the color values captured for each pixel over the time interval. During operation, the camera detects motion when the color value of one or more pixels deviates from the color value of the corresponding pixels in the pixel map by more than a threshold amount. Alternatively, the camera may detect motion when the color value of one or more pixels deviates from the color value of the corresponding pixels in the pixel map by more than a threshold amount over a predetermined time interval. Other mechanisms may be used to detect motion, such as machine-learning, computer vision, a user, or the like.

Camera 208 may transmit notifications to user devices associated with building 204 upon detecting motion. The resident device may obtain the video that corresponds to the motion and execute an object detection process to detect an object associated with the motion. For example, the resident device may determine that the motion corresponds to a predetermined entity (e.g., an individual), a vehicle, or other objects. The object detection may additionally determine if the entity is an authorized entity, such as an individual authorized to access building 204 or a vehicle associated with an individual authorized to access building 204.

In some instances, object detection may use a convolutional neural network or the like. Convolutional neural networks perform object detection in two steps: region proposal and classification. For example, the resident device may be trained to identify authorized entities, such as individuals authorized to access building 204 and their vehicles. Once trained, the convolutional neural network identifies boundary boxes (e.g., boxes that surrounds the object of interest). In some instances, this may be performed using the pixel map. For example, a subset of pixels that corresponds to the motion may be identified. The boundary box may be generated to encompass the subset of pixels.

In other instances, the convolutional neural network may use a region proposal network. A region proposal network identifies features that correspond to the object of interest in one or more frames of video and generates a plurality of boundary boxes that surround the feature. A score may be assigned to each boundary box based on how well it covers the feature. A non-maximum suppression process may then suppress boundary boxes that do not correspond to the maximum score. The convolutional neural network may then use a classifier to categorize the object in the boundary box. The resident device may use other techniques to detect objects within the video, such as you only look once (YOLO) or single shot detector (SSD), which can perform object detection as a single processing step.

Camera 208 detects motion in the driveway approaching access point 212(1) and transmits a notification to the resident device. The resident device requests a portion of video captured by camera 208 that corresponds to the motion. The resident device then executes the object detection process to determine that the object associated with the motion corresponds to a delivery truck. The resident device then transmits a notification to a user device that indicates a delivery truck was detected. In some instances, the resident device may transmit the portion of the video that corresponds to the motion of the object of interest (e.g., the user device may display video of the delivery truck pulling into the driveway towards access point 212(1). In other instances, the resident device may transmit a frame of video that includes the object of interest.

The resident device may include an exclusion list of objects of interest for which no notification is to be transmitted. For instance, the user may not want to receive notifications each time the user enters or leaves building 204. The resident device may determine whether an object detected corresponds to an object on the exclusion list, such as an authorized entity (e.g., an individual authorized to access building 204) or a vehicle associated with an authorized entity. If the object of interest is on the list, then the resident device may not transmit a notification to the user device. This ensures that motion associated with an object of interest is reported while motion associated with objects that are not of interest (e.g., those authorized to access building 204) is not reported.

Physical view 216 may include areas in which motion corresponds to objects that are unlikely to be of interest to an operator of camera 208. For instance, due to the proximity of adjacent building 228, physical view 216 may include a portion of walkway 232 leading to adjacent building 220. Physical view 216 may also include a portion of a vehicular throughway 236 that grants access to building 204 and adjacent building 220 (and optionally other buildings not shown). When camera 208 detects motion within physical view 224, camera 208 may detect motion in these areas that are unlikely to be associated with building 204 (e.g., objects associated with adjacent building 228 or objects that are passing by building 204). For instance, camera 208 may detect motion along throughway 236 each time a vehicle passes by. Camera 208 may also detect motion associated with object 240(1), which is accessing a public sidewalk, or object 240(2) passing through walkway 232 to access adjacent building 228. While the objects may not be of interest to the user of building 204, the user may be notified each time motion is detected by camera 208.

In some instances, an activity zone may be defined for a portion of the physical view captured by the camera to limit object detection to particular portions of the physical view. For instance, a user device may select a contiguous set of pixels from a frame of the video captured by the camera. A resident device can detect objects of interest within the activity zone and issue a notification to a user device.

The resident device may detect an object of interest even if the object of interest is not positioned entirely within an activity zone. Since the video captured by the camera may be a two-dimensional representation of three-dimensional space, the set of pixels selected to be the activity zone may correspond to a two-dimensional surface rather than a three-dimensional volume. As a result, objects of interest may or may not appear in the two-dimensional image as being entirely within the activity zone due to the angle of the camera and the two-dimensional representation. For example, if the pixels corresponding to a sidewalk are selected to be an activity zone when a person walks along the sidewalk, the video captured by the camera may represent a portion of the person as being positioned within the activity zone (e.g., the person's feet contacting the sidewalk) and a portion of the person as being positioned outside the activity zone (e.g., due to the perspective of the camera). The resident device identifies the person as the object of interest and determines that the person intersects with the activity even though only a portion of the person is positioned within the activity zone. The resident device then transmits a notification that a person has been detected.

Figure 3:
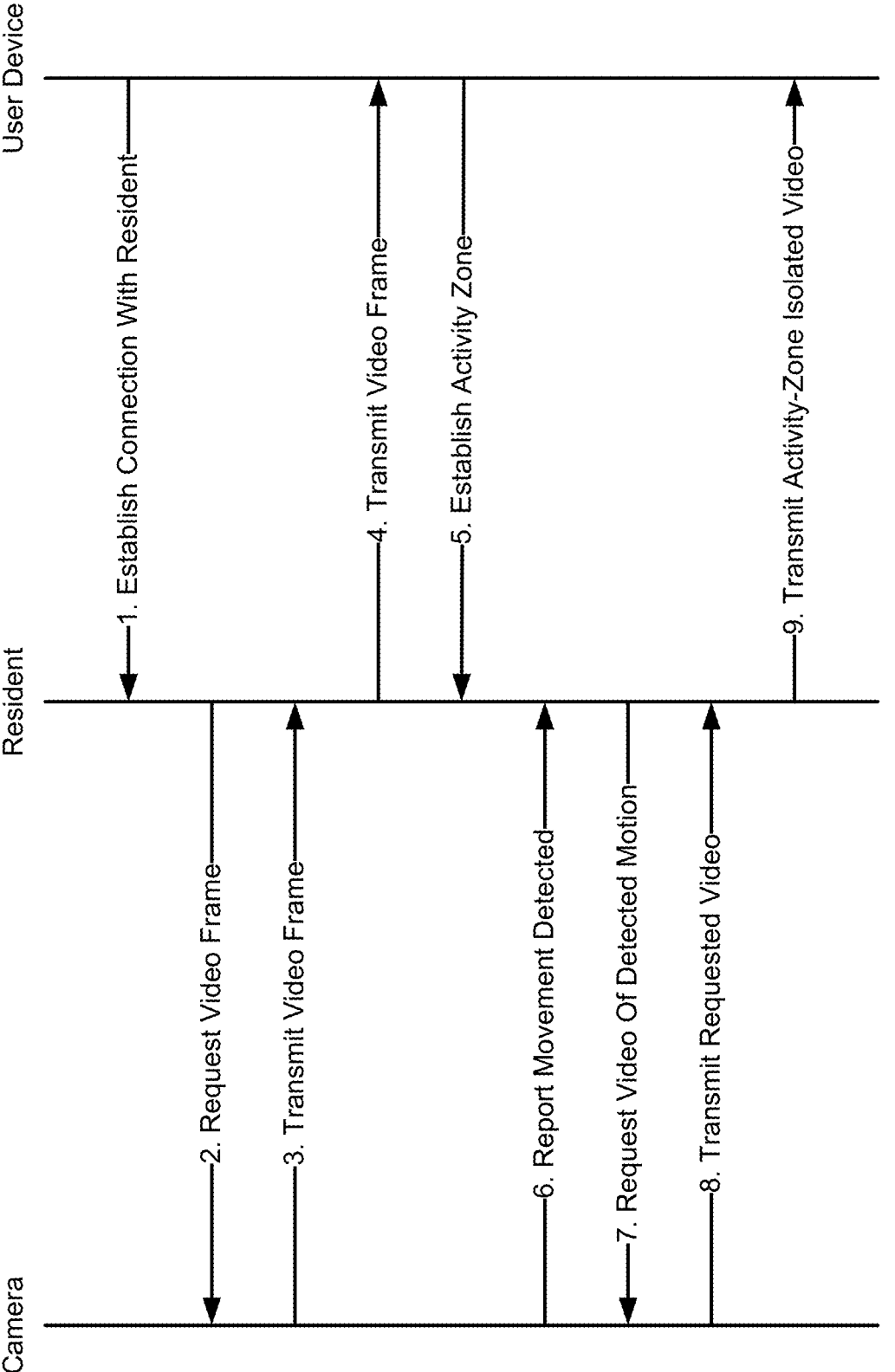
FIG. 3 illustrates a process diagram for selection of activity zones within a physical view captured by a camera according to an embodiment of the present disclosure.

FIG. 3 illustrates a process diagram for the selection of activity zones within a physical view captured by a camera according to an embodiment of the present disclosure. A user may select activity zones that correspond to a portion of a physical view captured by a camera to limit irrelevant notifications. For instance, a camera may capture a physical view that includes a driveway and a public sidewalk in front of a building. The user may select an activity zone that corresponds to the driveway to monitor the driveway as an access point. The camera may detect motion in the video and determine that an object is associated with the motion. In some instances, object detection may be performed to identify the object as being a class of objects (e.g., human, wild animals, pets, vehicles, packages, etc.) or being a particular object (e.g., John Smith, make or model of a vehicle, etc.). The camera (or resident device) may then determine if the motion corresponds to an object of interest and whether the object of interest intersects with the activity zone. A notification may be transmitted if the object of interest intersects with the activity zone and suppressed if the object of interest does not intersect with the activity zone. This may prevent a user from being notified when object detection identifies an object that is unlikely to be of interest to the user (e.g., a bird that flew by the camera).

In some instances, an exclusion zone may be identified in addition to or in place of an activity zone. An exclusion zone is an area of the physical view in which any motion is to be ignored by the resident device. For exclusion zones, the resident device may ignore the motion of an object that is entirely contained within the exclusion zone. For instance, a camera may capture a view of a parking lot adjacent to a building, where the view includes a window of the building. The user of the camera may be interested in objects within the parking lot and not interested in objects of the building (e.g., individuals inside the building that may walk by the window). An exclusion zone may be selected around the window to prevent motion detected within the building from triggering a notification to the user. Other motion captured within the view (e.g., motion within the parking lot) may continue to trigger notifications to the user.

A user device connects to a resident device that facilitates the operations of a camera. In some instances, the resident device may be a computing device that includes a processor, memory, and a network interface. In other instances, the resident device may be software that is executed by the user device, another device, or the camera. The resident device is configured to execute operations associated with the camera, including, but not limited to, capturing images from the camera, capturing video from the camera, and modifying a physical view of the camera (e.g., altering a focus, a zoom, or moving the camera). The resident device is configured to execute operations associated with analysis of video captured by the camera, including motion detection, object detection, and the like.

The user device transmits a request to the resident device to establish an activity zone or an exclusion zone. The resident device, in response, transmits a request to the camera for a frame of video. The frame of the video establishes the physical view captured by the camera so that the user device can identify the portions of the physical view that will correspond to the activity zone or exclusion zone. The camera may transmit the video frame to the resident device, which retransmits the video frame to the user device. Alternatively, the camera transmits the video frame directly to the user device.

The user device selects a portion of the physical view captured by the camera to be designated as an activity zone or an exclusion zone. The user device may select any number of activity zones and/or exclusion zones. The user device transmits an identification of the activity zones and/or exclusions zones within the physical view to the resident device. The user device may select the activity zone or exclusion zone by selecting one or more pixels of the video frame that correspond to the portion of the physical view.

In some instances, an activity zone (or exclusion zone) may already be established (e.g., during a previous process, during manufacturing, by a different user device) or established by a different process (e.g., using a neural network without receiving a video frame, or the like). In those instances, steps 1-4 or steps 1-5, as illustrated in FIG. 3 may be optional such that FIG. 3 may begin at step 5 or step 6 respectively.

The camera may continue to capture video of the physical view. Upon detecting motion in the physical view, the camera transmits a communication to the resident device indicating that motion was detected. At step 7, the resident device then requests a portion of the video captured by the camera that corresponds to the motion. The resident device receives the portion of the video at step 8 and performs an object detection process to identify the object associated with the motion. Object detection may include identifying a boundary box (e.g., image segmentation to identify the portion of the video corresponding to motion) or categorizing the object associated with the object using, for example, a neural network such as a convolutional neural network, YOLO, SSD, or the like.

If the object corresponds to an object of interest, then the process may continue to the next step in determining if the object is associated with an activity zone or an exclusion zone. For example, the resident device may use the neural network to determine types of objects that correspond to a context in which the resident device is trained to monitor the video from the camera. For instance, for a security context, the resident device may be trained to detect people (e.g., individuals that are authorized to access an area monitored by the camera and individuals that are unauthorized), vehicles (e.g., vehicles associated with authorized individuals, delivery vehicles, or the like), and predetermined objects (e.g., packages such as those commonly left from delivery drivers, suspicious objects such as objects that are out of place, or the like), combinations thereof, or the like. If the object does not correspond to an object of interest, then the resident device may wait for another notification from the camera that indicates that a subsequent motion was detected.

In another example, for safety contexts, the resident device may be trained to detect smoke, fire, gas, injured people (e.g., people that have collapsed, bodily fluids, etc.), combinations thereof, or the like. The neural network may be trained to detect any predetermined object type. In some instances, the context may be linked to a particular activity zone such that a first activity zone may have a security context, and a second security zone may be a safety (or other) context. In those instances, the resident device may operate one or more neural networks. For instance, a neural network may be configured to detect all predetermined object types. In another instance, a plurality of neural networks may be provided, with each neural network being configured to detect a particular class of predetermined object types.

Once the resident device determines that the motion corresponds to an object of interest, the resident device then determines if the object is associated with an activity zone or an exclusion zone. For activity zones, the resident device may determine that the object is associated with the activity zone if the object intersects with the activity zone (e.g., a portion of the object is within the activity zone). Since the activity zone may be selected from a two-dimensional image (e.g., the video frame) and the real-world object is three-dimensional, only a portion of the object may appear in the two-dimensional activity zone.

For example, if a walkway leading to a house is selected as an activity zone to detect individuals that may walk up to the door of the house, selected pixels may correspond to the walkway. When the individual walks up to the door, only the individual's feet may be within the pixels selected for the activity zone. The rest of the individual may correspond to pixels outside the activity zone (e.g., due to the individual extending perpendicular from the selected pixels of the walkway). Once the resident device detects motion and that the motion corresponds to an object of interest, the resident device determines if a portion of the object of interest interests the activity zone. If a portion of the object of interest does intersect with the activity zone, then the resident device transmits a notification indicating that the motion associated with an object of interest was detected.

If the conditions of the resident device are not met, then the resident device may not send a notification (i.e., the notification is suppressed). For example, if the camera detects motion, but the resident device determines that the motion does not correspond to an object of interest, then the resident device may suppress the notification. The notification may be suppressed even if the object corresponding to the motion intersects an activity zone. For another example, if the camera detects motion and the resident device determines that the motion corresponds to an object of interest but the object of interest does not intersect an activity zone, then the notification may be suppressed.

For yet another example, the camera may detect motion within the physical view. The resident device receives the video from the camera and identifies a set of objects. The resident device generates a subset of the set of objects that includes objects that correspond to objects of interest. The resident device then determines whether the motion detected by the camera corresponds to any of the objects of the subset of objects. For each object of the subset of objects (e.g., the objects of interest) that correspond to the motion detected by the camera, the resident device determines whether the object intersected an activity zone. If an object corresponds to the detected motion and intersects the activity zone, then the resident device transmits a notification identifying the object and indicating that the motion was detected.

In previous examples, it is possible that the camera may capture a first object that is an object of interest that does not intersect an activity zone and a second object that is not of interest but does intersect an activity zone. Even though a first object that was an object of interest was identified in the video and a second object intersected the activity zone, the resident device may suppress notifications because the first object did not intersect the activity zone and the second object was not an object of interest.

For exclusion zones, the resident device may determine that the object is associated with the exclusion zone if the object is within the exclusion zones. In this instance, the resident device determines if the entire object is within the exclusion zone. For example, if the physical environment includes a window into a building, the window may be selected as the exclusion zone so that motion associated with objects within the window (e.g., individuals inside the building) do not trigger notifications of motion in the exclusions zone. Other motions, such as motion associated with objects of interest within the areas outside the exclusions zone, may continue to trigger notifications of detected motion.

If the resident device determines that the detected motion corresponds to an object of interest that intersects with an activity zone or is not positioned within an exclusion zone, then the resident device transmits a notification to the user device that the object of interest was detected. The notification may include an identification of the object of interest (e.g., based on the categorization by the neural network). The user device may request additional information from the resident device, including, but not limited to, a frame of the video that includes the object of interest, the portion of the video corresponding to the detected motion of the object of interest, a time stamp associated with the detected motion, a time interval over which the motion was detected, the identification of the object of interest, combinations thereof, and the like. The additional information may be transmitted to the user device or to another device, e.g., at step 9.

In some instances, the notification of the detected motion and the additional information may be stored in a log associated with the camera. For instance, if the user device is offline, the notification may not be received by the user device. The user device may request the logged notification and additional information once the user device is online. Once the notification is transmitted to the user device and/or logged, the resident device may continue to monitor the camera (e.g., for new motion to be detected associated with a new object of interest). The process depicted in FIG. 3 may be repeated indefinitely.

Figure 4:
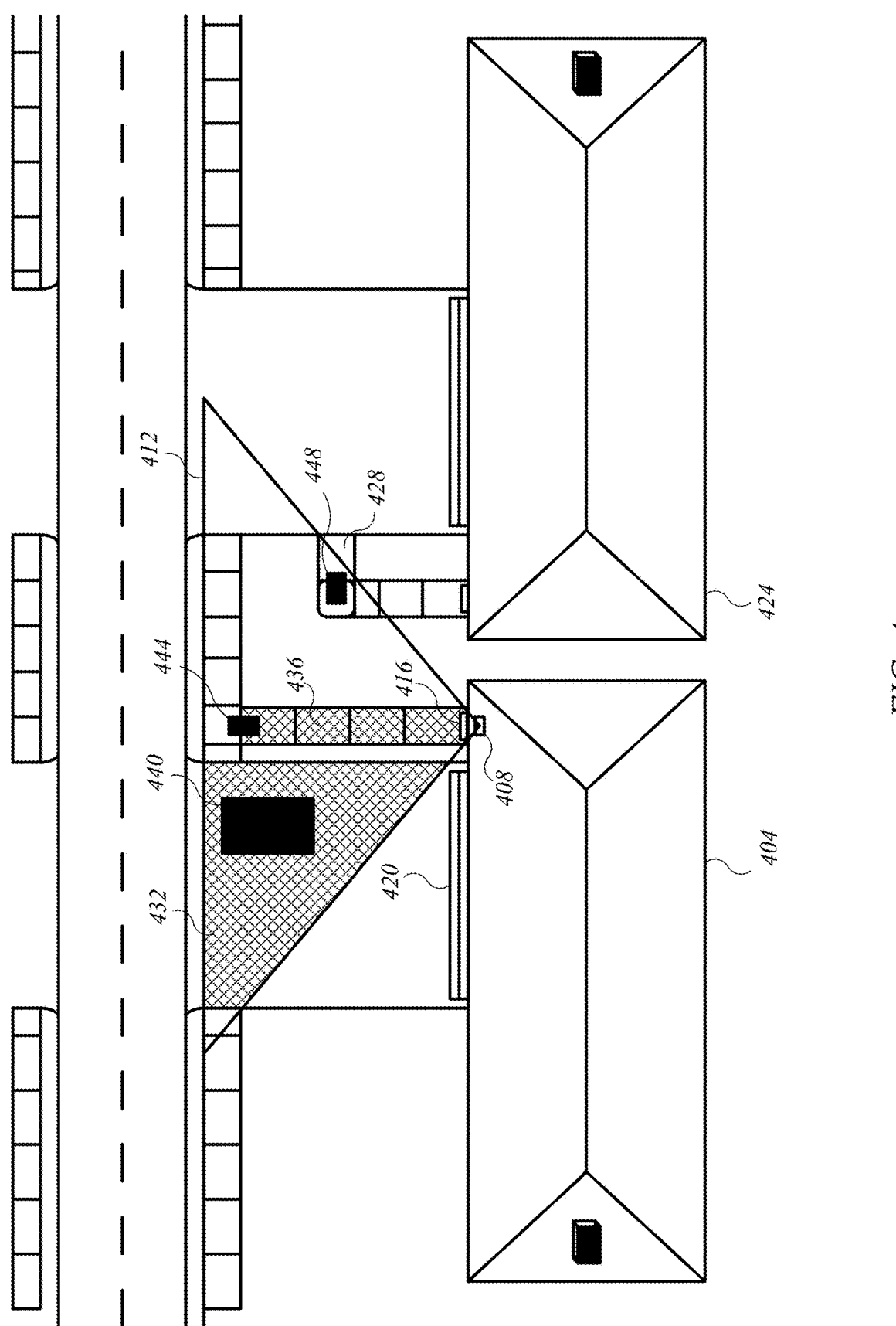
FIG. 4 illustrates an example operation of object detection using activity zones according to an embodiment of the present disclosure.

FIG. 4 illustrates an example operation of object detection using activity zones according to an embodiment of the present disclosure. Building 404 includes fixed-position camera 408, which is positioned to monitor access points to building 404. The camera may capture video of physical view 412 that includes a pedestrian access point (e.g., access point 416) and a vehicular access point (e.g., access point 420) to building 404. A resident device may be used to automate the monitoring of camera 404 using activity zones to detect objects of interest within physical view 412. For instance, due to the proximity of building 424, physical view 412 may include areas that may not be of interest to a user associated with building 404, such as the portion of walkway 428 leading to an access point of building 424. The resident device may use activity zones to limit monitoring of the video of camera 408 to areas of physical view 412 that may be of interest to the user.

A user device may operate the resident device to establish activity zones within physical view 412 captured by camera 408. The activity zones correspond to a subset of physical view 412. For instance, since camera 408 is positioned to capture access points to building 404, the user device may select a first subset of physical view 412 that corresponds to access point 420 to be a first activity zone 432 and a second subset of physical view 412 that corresponds access point 416 to be a second activity zone 436 to detect objects of interest that may be approaching or departing from access point 420 or access point 416.

When camera 408 detects motion associated with first object 440, the resident device determines whether first object 440 intersects an activity zone. Since object 440 intersects first activity zone 432, the resident device transmits a notification to the user device associated with building 404. When camera 408 identifies a second object 444 approaching or departing access point 416, camera 408 transmits a second notification to the resident device. The resident device determines that a portion of second object 444 intersects with second activity zone 436 and transmits a second notification to the user device. The resident device may trigger a notification in response to an object of interest being contained within an activity zone (e.g., such as first object 440 and first activity zone 432) or in response to a portion of an object of interest intersecting an activity zone (e.g., such as second object 444 and second activity zone 436).

Camera 408 may also capture motion associated with areas that are not of interest (e.g., not within an activity zone). For instance, camera 408 may transmit a notification to the resident device indicating motion was detected with physical view 412. The resident device may determine that the detected motion corresponds to third object 448. The resident device may then determine if a portion of third object 448 intersects an activity zone. Since third object 448 does not intersect an activity zone, the resident device may suppress the notification to the user device. In some instances, even though the notification is suppressed, the resident device may log the detected motion associated with objects that do not intersect with activity zones (e.g., stored) to enable future access by the user device.

Figure 5:
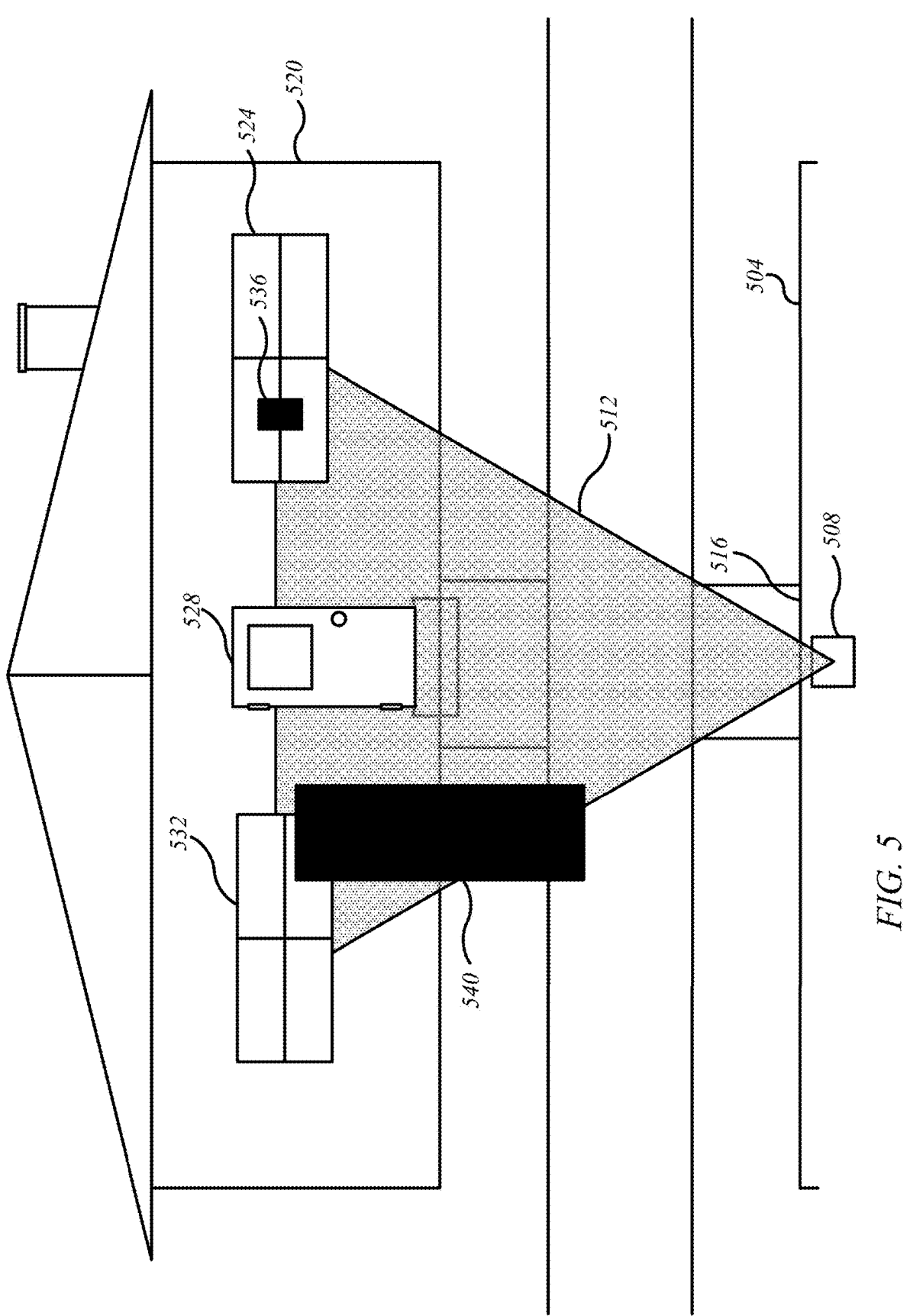
FIG. 5 illustrates an example operation of object detection using exclusion zones according to an embodiment of the present disclosure.

FIG. 5 illustrates an example operation of object detection using exclusion zones according to an embodiment of the present disclosure. Building 504 includes fixed-position camera 508 that captures physical view 512 that includes a pedestrian access point 516 to building 504. A resident device may be used to automate the monitoring of camera 508 using exclusion zones to detect objects of interest within physical view 516. For instance, due to the proximity of building 520, physical view 512 may include areas that may not be of interest to a user associated with building 504, such as window 524, door 528, and/or window 532. The resident device may use exclusion zones to exclude motion associated with areas of physical view 512 that may not be of interest to the user from trigger notifications to the user device.

The user device may define an exclusion zone to indicate areas of the physical view in which are not of interest to the user. For instance, if the camera is positioned to capture a pedestrian access point to a building where the physical view the camera includes a window of an adjacent building, then the camera may detect motion occurring in the adjacent building through the window. This may cause the user device to receive notifications that are not associated with the pedestrian access point. The user device may describe an exclusion zone that includes the window. When motion is detected in the exclusion zone that is the window, the resident device will suppress the notification of detected motion so that the user device is not presented with irrelevant notifications. In some instances, the resident device may continue to log that motion was detected for future use by the user device (e.g., to modify the position of the camera to reduce or remove the portion of the physical view that it includes the window, to adjust the size or shape of the exclusion zone, or to identify false negatives).

For exclusion zones, the resident device may ignore objects of interest that are contained in the exclusion zone. For instance, if a portion of an object of interest is not within the exclusion zone, then the resident device may still transmit the notification to the user device. Using the previous window example, the exclusion zone is intended to eliminate notifications associated with motion within the adjacent building detected through the window. If a portion of the object of interest is not within the exclusion zone then, the resident device can determine that the object is not in the adjacent building. The resident device may then transmit a notification indicating that motion associated with the object of interest is detected.

For instance, a user device may define an exclusion zone that corresponds to the portion of the physical view that corresponds to window 524, window, 532, and door 528. Later, camera 508 detects motion associated with object 536 and transmit a notification of the detected motion to a resident device. The resident device then requests and receives a subset of the video corresponding to the motion. The resident device uses the subset of the video to determine if the motion corresponds to an object of interest and if so whether the object is positioned within an activity zone or an exclusion zone. The resident device determines that object 536 is positioned entirely within the exclusion zone surrounding window 524 (e.g., likely to be inside building 520). Since object 536 is positioned entirely within the exclusion zone, the resident device may suppress the notification that would have been sent to the user device indicating that motion was detected. In some instances, the resident device may log the motion in persistent storage for later access by the user device.

In the example of FIG. 5, camera 508 also detects motion within physical view 512 that corresponds to object 540. Camera 508 transmits the indication of detected motion to the resident device and, upon request, transmits the subset of the video that corresponds to the motion. The resident device may identify object 540 and determines if the object is positioned within an activity zone or an exclusion zone. Although the resident device determines that a portion of object 540 may be positioned within the exclusion zone surrounding window 532, another portion of object 540 may not be positioned within the exclusion zone. The resident device transmits a notification to the user that indicates that motion was detected and that the motion corresponded to object 540. Since object 540 is not positioned entirely within the exclusion zone the object is likely positioned in front of the exclusion zone (e.g., in front of building 520 rather than inside it).

For example, if object 540 corresponds to an individual that is walking between building 504 and building 520, physical view 512 of camera 508 pointing towards building 520 may be temporarily blocked by the individual passing by. Though the individual may be walking on the sidewalk in front of building 520, on video captured by camera 508, the upper portion of the individual may intersect with window 532. The resident device may not suppress the notification associated with object 540 to ensure that the user device receives the notification that an individual is walking close by. In a security context, the user device may receive notifications from the resident device that correspond to object of interest (e.g., individuals and/or vehicles that are nearby) while suppressing notifications that may not be relevant to the security context of the user device (e.g., the people in an adjacent building).

Though the example of FIG. 5 illustrates only two objects, object 536 and object 540, being detected near or within exclusion zones, camera 508 and the resident device may detect motion associated with any number of and any type of object within physical view 512. Using exclusion zones, the resident device may transmit notifications associated with any motion of any object of interest that is positioned at least partially outside an exclusion zone.

FIG. 6 shows a flow diagram of a process for detecting objects of interest within activity zones of a physical view captured by a camera according to an embodiment of the present disclosure. At block 604, a video stream is received from a camera. The video stream may correspond to a continuous stream of frames from the camera. The video stream may include a physical view captured by the camera.

At block 608, information is received that identifies a zone of the physical view represented by the video stream. The zone may correspond to a contiguous portion of the physical view. For instance, a user device may connect to a resident device that controls operations of the camera. The resident device may request a frame of video that includes the physical view and transmit the frame to the user device. The user device may select a portion of the frame that corresponds to a portion of the physical view to define the zone. In some instances, the user device may select a set of contiguous pixels from pixels of the frame. In other instances, the user device may select a boundary box of any predetermined shape and/or area. In still yet other instances, the user device may select the zone through an identification of the physical properties of the physical area to be encompassed by the zone, such as, but not limited to, location (e.g., within the frame of the video stream), area, height, width, and/or the like.

At block 612, motion is detected. For instance, the camera may detect motion that occurs with the physical view captured by the camera. Alternatively, a resident device may detect motion. For instance, the resident device may be executed by the camera or as a separate processing device. As a separate processing device, the resident device may receive the video stream from the camera and analyze the video to detect motion. Motion may be detected through pixel analysis (e.g., variation in pixel values), machine learning (e.g., such as a neural network or the like), a user, or the like.

In some instances, the resident device may be configured to detect an object of interest that is correlated with the detection motion within the physical view. For instance, the resident device may be configured (e.g., via selection of one or more settings, user input, or the like) to process the portion of the video stream that corresponds to motion within the physical view or process the portion of the video stream that corresponds to a particular object of interest that was detected and that corresponds to the detected motion within the physical view. If the resident device is configured to process the portion of the video stream that corresponds to motion within the physical view then the process continues at block 632. If the resident device is configured to process the portion of the video stream that corresponds to a particular object of interest that was detected and that corresponds to the detected motion within the physical view, the process continues to block 616.

At block 616, a portion of an object of interest may be detected within the physical view captured by the camera. An object of interest may correspond to any object in which the resident device is trained to categories such as people, animals, vehicles, packages, combinations thereof, or the like. Object detection may be performed by the resident device, which uses a trained neural network to categorize objects within the video. In response to receiving an indication of motion detected, the resident device may request a subset of the video stream that corresponds to the motion. The resident device may then analyze the video to detect objects within the subset of the video stream.

At block 620, it is determined that the object of interest corresponds to the motion. For instance, in a security context, the resident device may identify objects that correspond to authorized individuals and security threats (e.g., unauthorized individuals, out-of-place vehicles, out-of-place-packages, or the like). The resident device determines if the motion detected by the camera corresponds to the object of interest in order to determine whether to transmit a notification to a user device reporting the motion.

At block 624, the resident device determines whether a portion of the object of interest is positioned near a zone. For activity zones, the resident device determines if the portion of the object of interest intersects the activity zone. If the portion of the object does intersect the activity zone then processing continues to block 628. For exclusion zones, the resident device determines if the object of interest is positioned entirely within the exclusion zone. If the object of interest is positioned entirely within the exclusion zone then notifications associated with the motion of the object of interest may be suppressed (e.g., the resident device may not transmit the notification to the user device). The notification may be logged to enable the user device to review suppressed notification at a later time. With the notification suppressed, the process may return to block 612 and wait for subsequent motion to be detected. If the object of interest is not positioned entirely within the exclusion zone, then the resident device continues to block 628.

At block 628, the resident device initiates further processing of the video in response to determining that the portion of the object intersects with an activity zone (or in the case of exclusion zones is not entirely positioned with the exclusion zone). The further processing includes:

At block 632, the subset of the video stream that corresponds to the detected motion maybe stored. In some instances, the subset of the video stream may be modified to highlight the object of interest and/or the motion. For instance, the subset of the video processed (e.g., to lighten, darken, sharpen, etc. each frame), cropped to remove portions that do not correspond to the object of interest and/or the motion, annotated, combinations thereof, or the like. The subset of the video stream may be stored with metadata that corresponds to additional information captured with the video such as, but not limited to, a geolocation (e.g., user-device specified or using GPS), timestamp, an indication of the time interval over which the motion occurred, an identification of the object of interest, an identification of one or more other subsets of video streams that are associated with a same object of interest and/or motion, an identification of the motion, an indication of a zone type (e.g., activity zone or exclusion zone), annotations received by the user device (e.g., with user notes, description of the subset of the video stream, description of the motion, description of the object of interest, description of the zone, combinations thereof, and the like), combinations thereof, or the like.

At block 636, a notification may be transmitted to the user device indicating that motion was detected and identifying the subset of the video stream. In some instances, the notification may include the identification of the object of interest and/or the motion. In response to receiving the notification, the user device may request the subset of the video stream. The resident device may then transmit the subset of the video stream to the user device. The resident device may also transmit the metadata associated with the subset of the video stream or upon a subsequent request by the user device. If the identification of the object of interest and/or motion was not transmitted with the notification to the user device, the resident device may transmit the identification of the object of interest and/or motion with the subset of the video and/or the metadata.

Once the notification is transmitted to the user device, the process may return to block 612 and wait for subsequent motion to be detected. Blocks 612-636 may execute any number of times (and in any particular order) to continually detect motion within a video stream of a physical view captured by the camera. In some instances, the resident device may receive input from the user device identifying additional activity or exclusion zones or modifications to existing activity zones or exclusion zones. The identification of new activity zones or exclusion zones or modifications to existing activity zones or exclusion zones may be processed in real-time while the operations of FIG. 6 are executing and without interrupting any individual block of FIG. 6. For instance, if a zone is modified during operations, the resident device may complete a current execution of processes 612-636 while establishing the modified zone. During the next execution of block 612, the newly modified zone may be used in placed of the previous zone. Zones may be modified by altering a location, shape, area, type (e.g., activity zone or exclusion zone), combinations thereof, or the like.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage media, optical storage media, flash memory devices and/or other machine readable media for storing information. The term "computer-readable medium" includes, but is not limited to portable or fixed storage devices, optical storage devices, and/or various other storage media capable of storing that contain or carry instruction(s) and/or data.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve software application and the software development processes. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used in association with the subset of the video stream to provide context surrounding the detected motion and/or object of interest. Accordingly, use of such personal information data enables users to improve a particular application used by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of object detection using activity or exclusion zones, the present technology can be configured to allow users to select to "opt in" or "opt out" of participation in the collection of personal information data during registration for services or anytime thereafter. In another example, users can select not to provide metadata or other potentially personal information associated with the user of the camera, the object of interest, the subset of the video stream, or the user of the mobile device. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, notifications may be transmitted based on non-personal information data or a bare minimum amount of personal information, such other non-personal information available from other sources, or publicly available information. For instance, transmitting notifications of detected motion may include the indication of detected motion without including personal information about the user of the camera, object of interest, or user of the user device such as collected metadata or the like.

Although the techniques has been described with respect to specific embodiments, it will be appreciated that the disclosure is intended to cover all modifications and equivalents within the scope of the following claims.

What is claimed is:

1. A method, comprising:

receiving, by a resident device from a camera separate from the resident device, a communication indicating that motion was detected;

in response to receiving the communication indicating that motion was detected, requesting a portion of video captured by the camera corresponding to the motion that was detected, wherein the portion of video captures a physical view;

after requesting the portion of video captured by the camera corresponding to the motion, receiving, by a processor of a resident device, the portion of the video captured by the camera corresponding to the motion;

receiving, by the processor, information that identifies an exclusion zone within the portion of video captured by the camera corresponding to the motion, wherein the exclusion zone is a predetermined area of the physical view where motion is ignored by the processor;

detecting, by the processor, a portion of an object within the physical view;

determining, by the processor, that the motion corresponds to the object within the physical view;

determining, by the processor, whether the object within the physical view is an object of interest; and in response to determining that the object within the physical view is the object of interest:

determining whether the object of interest is entirely within the exclusion zone; and in response to determining that the object of interest is entirely within the exclusion zone, suppressing a notification, to a user device, about the detected motion within the physical view, wherein the user device is separate from the camera and the resident device.

2. The method of claim 1, further comprising:

after receiving the video captured by the camera corresponding to the motion, receiving, from the user device, a request to establish the exclusion zone; and transmitting, to the user device and in response to the request, a frame of video of the physical view.

3. The method of claim 1, further comprising:

generating a log that stores an indication of the suppression of the notification, wherein the log is stored in memory.

4. The method of claim 1, wherein the portion of the object is a first portion of the object, and wherein the method further comprises:

receiving, by the processor, information that identifies an activity zone within the video stream that comprises the subset of the physical view; and in response to determining that the object is the object of interest and that the object of interest is not entirely within the exclusion zone:

determining that a second portion of the object of interest is within the activity zone;

storing a subset of the video stream that corresponds to the object of interest; and transmitting, to the user device, a second notification that identifies the subset of the video stream.

5. The method of claim 4, wherein the subset of the video stream includes two or more frames of the video stream that correspond to the motion of the object of interest.

6. The method of claim 4, further comprising:

receiving, from the user device, a request for the subset of the video stream; and transmitting, in response to receiving the request, the subset of the video stream to the user device.

7. The method of claim 4, wherein the notification comprises an identification of the object of interest.

8. A device, comprising:

a memory comprising computer-executable instructions; and one or more processors in communication with the memory and configured to access the memory and execute the computer-executable instructions to perform operations including:

receiving, by a resident device from a camera separate from the resident device, a communication indicating that motion was detected;

in response to receiving the communication indicating that motion was detected, requesting a portion of video captured by the camera corresponding to the motion that was detected, wherein the portion of video captures a physical view;

after requesting the portion of video captured by the camera corresponding to the motion, receiving, by a processor of a resident device, the portion of the video captured by the camera corresponding to the motion;

receiving, by the processor, information that identifies an exclusion zone within the portion of video captured by the camera corresponding to the motion, wherein the exclusion zone is a predetermined area of the physical view where motion is ignored by the processor;

detecting, by the processor, a portion of an object within the physical view; determining, by the processor, that the motion corresponds to the object within the physical view;

determining, by the processor, whether the object within the physical view is an object of interest; and in response to determining that the object within the physical view is the object of interest:

determining whether the object of interest is entirely within the exclusion zone; and in response to determining that the object of interest is entirely within the exclusion zone suppressing a notification, to a user device, about the detected motion within the physical view, wherein the user device is separate from the camera and the resident device.

9. The device of claim 8, wherein the one or more processors configured to further perform operations including:

after receiving the video captured by the camera corresponding to the motion, receiving, from the user device, a request to establish the exclusion zone; and transmitting, to the user device and in response to the request, a frame of video of the physical view.

10. The device of claim 8, wherein the one or more processors configured to further perform operations including:

generating a log that includes an indication of the suppression of the notification, wherein the log is stored in memory.

11. The device of claim 8, wherein the portion of the object is a first portion of the object, and wherein the one or more processors configured to further perform operations including:

receiving, by the one or more processors, information that identifies an activity zone within the video stream that comprises the subset of the physical view; and in response to determining that the object is the object of interest and that the object of interest is not entirely within the exclusion zone:

determining that a second portion of the object is within the activity zone;

storing a subset of the video stream that corresponds to the object of interest; and transmitting, to the user device, a second notification that identifies the subset of the video stream.

12. The device of claim 11, wherein the subset of the video stream includes two or more frames of the video stream that correspond to the motion of the object of interest.

13. The device of claim 11, wherein the one or more processors configured to further perform operations including:

receiving, from the user device, a request for the subset of the video stream; and transmitting, to the user device and in response to receiving the request, the subset of the video stream to the user device.

14. The device of claim 11, wherein the notification includes an identification of the object of interest.

15. A computer-readable storage medium comprising computer-executable instructions that, when executed by one or more processors, causes the one or more processors to perform operations including:

receiving, by a resident device from a camera separate from the resident device, a communication indicating that motion was detected;

in response to receiving the communication indicating that motion was detected, requesting a portion of video captured by the camera corresponding to the motion that was detected, wherein the portion of video captures a physical view;

after requesting the portion of video captured by the camera corresponding to the motion, receiving, by a processor of a resident device, the portion of the video captured by the camera corresponding to the motion;

receiving, by the processor, information that identifies an exclusion zone within the portion of video captured by the camera corresponding to the motion, wherein the exclusion zone is a predetermined area of the physical view where motion is ignored by the processor;

detecting, by the processor, a portion of an object within the physical view; determining, by the processor, that the motion corresponds to the object within the physical view;

determining, by the processor, whether the object within the physical view is an object of interest; and in response to determining that the object within the physical view is the object of interest:

determining whether the object of interest is entirely within the exclusion zone; and in response to determining that the object of interest is entirely within the exclusion zone suppressing a notification, to a user device, about the detected motion within the physical view, wherein the user device is separate from the camera and the resident device.

16. The computer-readable storage medium of claim 15, wherein the instructions, when executed, cause the one or more processors to perform operations including:

after receiving the video captured by the camera corresponding to the motion, receiving, from the user device, a request to establish the exclusion zone; and transmitting, to the user device and in response to the request, a frame of video of the physical view.

17. The computer-readable storage medium of claim 15, wherein the instructions, when executed, cause the one or more processors to perform operations including:

generating a log that includes an indication of the suppression of the notification, wherein the log is stored in memory.

18. The computer-readable storage medium of claim 15, wherein the portion of the object is a first portion of the object, and wherein the instructions, when executed, cause the one or more processors to perform operations including:

receiving, by the one or more processors, information that identifies an activity zone within the video stream that comprises the subset of the physical view; and in response to determining that the object is the object of interest and that the object of interest is not entirely within the exclusion zone:

determining that a second portion of the object of interest is within the activity zone;

storing a subset of the video stream that corresponds to the object of interest; and transmitting, to the user device, a second notification that identifies the subset of the video stream.

19. The computer-readable storage medium of claim 18, wherein the instructions, when executed, cause the one or more processors to perform operations including:

receiving, from the user device, a request for the subset of the video stream; and transmitting, in response to receiving the request, the subset of the video stream to the user device.

20. The computer-readable storage medium of claim 18, wherein the notification includes an identification of the object of interest.

21. The method of claim 1, further comprising:

in response to determining that the object within the physical view is not the object of interest, forgoing transmission of, to the user device, a notification about the detected motion within the physical view.

* * * * *